United States Patent [19]

Bundy et al.

[11] 4,075,030

[45] Feb. 21, 1978

[54] HIGH BULKING CLAY PIGMENTS AND METHODS OF MAKING THE SAME

[75] Inventors: Wayne M. Bundy, Westfield; Joseph P. Berberich, Barnegat; David Sastre, Elizabeth, all of N.J.

[73] Assignee: Yara Engineering Corporation, Elizabeth, N.J.

[21] Appl. No.: 820,856

[22] Filed: Aug. 1, 1977

Related U.S. Application Data

[63] Continuation-in-part of Ser. No. 591,851, June 30, 1975, abandoned.

[51] Int. Cl.$^2$ .............................................. C04B 31/26
[52] U.S. Cl. ................................ 106/288 B; 106/291; 106/DIG. 3; 209/5
[58] Field of Search ............. 106/288 B, 291, DIG. 3; 209/5; 210/53, 54 C

[56] References Cited

U.S. PATENT DOCUMENTS

| | | | |
|---|---|---|---|
| 3,533,821 | 10/1970 | Lundquist | 106/288 B |
| 3,850,653 | 11/1974 | Zentz | 106/288 B |

*Primary Examiner*—Winston A. Douglas
*Assistant Examiner*—J. V. Howard
*Attorney, Agent, or Firm*—Buell, Blenko & Ziesenheim

[57] ABSTRACT

A high bulk clay product and method of making the same are provided in which kaolinite is selectively flocculated to produce an ultra fine particle fraction in the presence of fine mica below 150 mesh in size and the resulting flocculant is collected and dried.

9 Claims, No Drawings

HIGH BULKING CLAY PIGMENTS AND METHODS OF MAKING THE SAME

This application is a continuation-in-part of our co-pending application Ser. No. 591,851, filed June 30, 1975, now abandoned.

This invention relates to high bulking clay pigments and methods of making the same and particularly to a clay product producing higher void volume in coatings in which it is the primary pigment.

The demand for opacifying pigments in various industries, such as for example, in coating materials, has been long recognized and many mineral materials have been proposed and used. The primary and most used opacifier for this purpose is titanium dioxide.

We have discovered that we can obtain better opacity and improved brightness and reflectance in coatings as compared with $TiO_2$, by the use of kaolinite which has been treated to incorporate voids to form a high bulking clay.

We have found this can be accomplished by selective flocculation of ultra fine particles of clay and by combining the fine particles with mica particles below 150 mesh in size.

We have also discovered that in addition to improving opacity we can also improve the gloss in paper coatings if we control the bleach conditions such that the pH is held in the range 3.5 to 4. The bleaching agent can be any of the well known clay bleaching chemicals such as sodium hydrosulfite, zinc hydrosulfite, etc.

We have found that kaolinite can be selectively flocculated to recover ultra fine particles by the use of low molecular weight (below 1,000,000) organic flocculants in the presence of a mineral acid flocculant. We prefer to use a mixture of polyamine and citric acid as the flocculant in our process with the addition of a mineral acid to reduce the pH to cause a clear separation of the selectively flocculated kaolin.

The invention will be perhaps most readily understood by reference to the following examples.

EXAMPLE I

A kaolinite generally known as Coss Hodges (Y-684) from the Sandersville, Georgia area was blunged in water with 0.08% sodium hexametaphosphate and fractionated to 0.08 cps at 10 minutes (i.e. 94% less than $2\mu$). The pH of the recovered fraction was raised to 8.8 using sodium hydroxide (0.40% solution). The fraction was then treated with 0.10% Ethylenediamine + 0.30% Citric Acid in a 0.40% solution of water. It contained up to 0.1% of mica in the size range less than 150 mesh. It was then flocculated to pH 2.5 using a 10% solution of sulfuric acid and bleached using 5 lbs./ton of sodium hydrosulfite, filtered and rinsed. The filter cake was then attrition ground and dried at 65° C.

A control sample was treated in the same way but without addition of amine and Citric Acid.

EXAMPLE II

Another Coss Hodges (Y-535) kaolinite from Sandersville, Georgia area was blunged in water with 0.08% sodium hexametaphosphate and fractionated to 0.08 cps at 10 minutes. The pH of the recovered fraction was raised to 8.8 using sodium hydroxide (0.40% solution). The fraction was then treated with 0.10% Ethylenediamine + 0.30% Citric Acid in a 0.40% solution of water. It contained up to 0.3% of mica in the size range less than 150 mesh. It was then flocculated to pH 2.5 using a 10% solution of sulfuric acid and bleached using 5 lbs./ton of sodium hydrosulfate, filtered and rinsed. The filter cake was then attrition ground and dried at 65° C.

A control sample was treated in the same way but with the selective flocculation step of adding amine and Citric Acid.

The two kaolinites were incorporated in standard coatings and the gloss, reflectance (nm) whiteness and % opacity were determined. The values appear in Table I.

TABLE I

| Sample | % 325 Mesh Residue | 75° Gloss | (Brighteners) R 457 nm | Whiteness Index | % Opacity |
| --- | --- | --- | --- | --- | --- |
| Example I (Control) | | 47 | 72.3 | 32 | 89.9 |
| Example I | 0.0193 | 51.8 | 72.7 | 30.9 | 90.8 |
| Example II (Control) | | 56 | 73 | 30 | 90.0 |
| Example II | 0.0383 | 56.2 | 73.7 | 29.3 | 91.0 |

EXAMPLE III

A kaolinite generally known as Meek's Crude, Y-707 from the Sandersville, Georgia area was blunged in water with 0.08% sodium hexametaphosphate and sodium hydroxide (0.40% solution to pH 7.4. The crude slurry was then fractionated to 0.06 cps at 10 minutes. The fraction was then screened thru a 200 mesh screen. To the screened fraction, 0.10% of 325 Mesh White Waterground Mica was added. The clay then contained 0.4 to 0.7% mica in the size range less than 200 mesh. It was then flocculated to pH 2.5 using 10% solution of sulfuric acid and bleached using 10 lbs./ton of sodium hydrosulfite, filtered and rinsed. The filter cake was then dispersed with 0.30% sodium hexametaphosphate and sodium hydroxide (0.40% solution) to pH 7.4 and dried at 65° C. The coating properties of this untreated clay with and without added micas are the same and appear in Table II. This is the control sample for Examples IV and V.

EXAMPLE IV

Another Meek's Crude, Y-707 kaolinite from the Sandersville, Georgia area was blunged in water with 0.08% sodium hexametaphosphate and sodium hydroxide (0.40% solution) to pH 7.4. The crude slurry was then fractionated to 0.06 cps at 10 minutes. The pH of the recovered fraction was raised to 8.8 using sodium hydroxide (0.4% solution). The fraction was then treated with 0.10% Hexamethylenediamine + 0.10% Citric Acid in a 0.20% solution of water. The clay contained 0.3 to 0.6% mica in the size range less than 200 mesh. It was then flocculated to pH 2.5 using 10% solution of sulfuric acid and bleached using 10 lbs./ton of sodium hydrosulfite, filtered and rinsed. The filter cake was then dispersed with 0.3% sodium hexametaphosphate and sodium hydroxide (0.40% solution) to pH 7.4 and dried at 65° C.

EXAMPLE V

A third Meek's Crude, Y-707 kaolinite from the Sandersville, Georgia area was blunged in water with 0.08% sodium hexametaphosphate and sodium hydroxide (0.40% solution) to pH 7.4. The crude slurry was then fractionated to 0.06 cps at 10 minutes. The 0.06 fraction was then screened thru a 200 mesh screen. The pH of the screened material was raised to 8.8 using sodium hydroxide (0.40% solution). To this fraction, 0.10% of 325 Mesh White Waterground Mica was added. The clay contained 0.4 to 0.7% mica in the range less than 200 mesh. The fraction was then treated with 0.10% Hexamethylenediamine + 0.10% Citric Acid in a 0.20% solution of water. It was then flocculated to pH 2.5 using 10% solution of the sulfuric acid and bleached using 10 lbs./ton of sodium hydrosulfite, filtered and rinsed. The filter cake was then dispersed with 0.3% sodium hexametaphosphate and sodium hydroxide (0.40% solution) to pH 7.4 and dried at 65° C.

The three foregoing kaolinites were incorporated in standard coatings and the gloss, reflectance, whiteness and % opacity determined. The values appear in Table II.

TABLE II

| Sample | 75° Gloss | (Brighteners) R 457 nm | Whiteness Index | % Opacity |
|---|---|---|---|---|
| Example III (Control) | 55.7 | 72.7 | 31.2 | 90.6 |
| Example III (+ mica) | 55.7 | 72.7 | 31.2 | 90.6 |
| Example IV | 54.9 | 73.4 | 30.0 | 91.1 |
| Example V | 54.8 | 74.0 | 29.6 | 91.6 |

It can be seen from the foregoing Table that selected flocculation of fine particles Example IV improved the opacity, whiteness and brightness over the clay merely separated by sieving even with addition of mica Example III, whereas the combination of selective flocculation plus the addition of mica, Example V produced the greatest increase in % opacity, whiteness and brightness.

EXAMPLE VI

A kaolinite was treated in Example I with Ethylenediamine and Citric Acid in the presence of sulfuric acid to selectively flocculate the ultrafine kaolinite particles and mica and then bleached at varying pH levels from pH 2.0 to pH 4.0. The gloss of a paper coating formulate from each such clay was determined and appears in Table III.

TABLE III

| | pH | Gloss |
|---|---|---|
| Sample 1 | 4.0 | 64.2 |
| Sample 2 | 3.5 | 63.5 |
| Sample 3 | 3.0 | 61.6 |
| Sample 4 | 2.5 | 62.0 |
| Sample 5 | 2.0 | 61.0 |

The marked improvement in gloss at pH 3.5 to 4.0 is immediately apparent.

While we have set out certain preferred practices and embodiments of our invention in the foregoing specification it will be understood that this invention may be otherwise embodied within the scope of the following claims.

We claim:

1. A method of producing a high bulking kaolinite of improved opacity comprising the steps of:
   a. adding to a kaolinite slurry a selective flocculant for ultrafine particles and thereafter sufficient sulfuric acid in the presence of about 0.1% to about 0.7% fine mica below 150 mesh in size to recover from the kaolinite a flocculated ultrafine particle kaolinite fraction admixed with the mica, and
   b. collecting and drying the selectively flocculated fine particle kaolinite and mica mixture as a dry pigment material.

2. A method as claimed in claim 1 wherein selective flocculation of the kaolinite is carried out by the addition of an organic flocculant having a molecular weight below 1,000,000.

3. A method as claimed in claim 1 wherein selective flocculation of the kaolinite is carried out by the addition of a polyamine and citric acid.

4. A method as claimed in claim 1 wherein the selective flocculation was carried out with the addition of ethylenediamine and citric acid.

5. A method as claimed in claim 1 for producing a high bulking kaolinite of improved gloss in paper coating wherein the kaolinite is bleached at pH 3.5 to 4.0 following selective flocculation.

6. A high bulking dry kaolinite consisting essentially of fine particle size kaolinite co-flocculated with about 0.1% to about 0.7% of mica having a size below 150 mesh and produced by the steps of:
   a. adding to a kaolinite slurry a selective flocculant for ultrafine particles and thereafter sufficient sulfuric acid in the presence of about 0.1% to about 0.7% fine mica below 150 mesh in size to recover from the kaolinite a flocculated ultrafine particle kaolinite fraction admixed with the mica, and
   b. collecting and drying the selectively flocculated fine particle kaolinite and mica mixture as a dry pigment material.

7. A high bulking kaolinite as claimed in claim 6 wherein the kaolinite is recovered by selective flocculation with an organic flocculant having a molecular weight less than 1,000,000.

8. A high bulking kaolinite as claimed in claim 6 wherein the kaolinite is recovered by selective flocculation with a polyamine and citric acid mixture and sufficient sulfuric acid to separate the selectively flocculated clay from suspension.

9. A high bulking kaolinite as claimed in claim 6 having improved gloss in paper coating wherein the kaolinite is bleached at a pH of 3.5 to 4.0 following selective flocculation.

* * * * *